United States Patent [19]

Wildes et al.

[11] Patent Number: 5,212,645

[45] Date of Patent: May 18, 1993

[54] FLEXIBLE REAL-TIME, MULTI-TASKING ARCHITECTURE FOR TOOL CONDITION MONITORING

[75] Inventors: Douglas G. Wildes, Ballston Lake; Steven R. Hayashi, Schenectady; George D. Montanaro, Scotia, all of N.Y.

[73] Assignee: General Electric Company, Schenectady, N.Y.

[21] Appl. No.: 554,495

[22] Filed: Jul. 19, 1990

[51] Int. Cl.⁵ .............................................. G06F 15/46
[52] U.S. Cl. ............................... 364/463; 364/474.16; 364/551.02; 340/680
[58] Field of Search ............... 364/468, 474.16, 474.17, 364/474.19, 550, 551.02, 264, 269.4; 340/680, 679

[56] References Cited

U.S. PATENT DOCUMENTS

| | | |
|---|---|---|
| 4,069,488 | 1/1978 | Florenza et al. ................. 364/474.11 |
| 4,088,899 | 5/1978 | Miller et al. ...................... 364/474.16 |
| 4,100,597 | 7/1978 | Fleming et al. .................. 364/474.23 |
| 4,698,766 | 10/1987 | Entwistle et al. ................... 364/468 |
| 4,974,181 | 11/1990 | Sinderson et al. .................. 364/550 |
| 4,980,844 | 12/1990 | Demjanenko et al. .............. 364/550 |
| 5,018,097 | 5/1991 | Kuhlmann et al. .................. 395/700 |

FOREIGN PATENT DOCUMENTS 0102251A 1/1983 European Pat. Off.
2211788A 4/1988 United Kingdom.
2232505A 5/1989 United Kingdom.

Primary Examiner—Jerry Smith
Assistant Examiner—Paul Gordon
Attorney, Agent, or Firm—James Magee, Jr.

[57] ABSTRACT

This invention utilizes a system of interlinked modular hardware and modular software for continuously controlling the manufacture of a workpiece. By using a modular architecture, the system capabilities can be expanded or modified without requiring major redesign.

26 Claims, 10 Drawing Sheets

FLEXIBLE REAL-TIME, MULTI-TASKING ARCHITECTURE FOR TOOL CONDITION MONITORING

FIELD OF THE INVENTION

This invention relates to a system and method for continuously controlling the manufacturing of a workpiece.

This invention interlinks modular hardware and modular software. By using a modular architecture, the capabilities of the controller can be expanded or modified without requiring major redesign.

BACKGROUND OF THE INVENTION

The Edge Monitoring System is a method by which manufacture of a workpiece can be controlled by a system having architecture comprising modular hardware and modular software. Signals are detected from the manufacturing process and transmitted to the system by the modular hardware. The signals are then processed by the modular software for detecting specific features or patterns in these signals to control the manufacturing process.

Illustrative of an example of the type of modular hardware is that described in commonly assigned U.S. Pat. No. 4,806,914 for Detection by Automatic Gain Control Features of Gradual Cutting Tool Breakage. This application describes several tool monitoring patents. Each of these devices has employed an analysis of signals, specifically vibration signals produced when machining a workpiece in order to detect a tool break.

Examples of these devices include a tool monitor based upon a high frequency vibration signal, a tool monitor based upon an acoustic emission sensor, a tool monitor based upon three-axis force transducers, a tool monitor based upon strain sensors, or a tool monitor based upon a spindle power sensor. Each of these devices is specific to a single type of sensor. All of these devices are particularly designed for a specific machining operation. None of these devices have the capability of controlling a variety of different tooling operations because each is designed for its particular tooling procedure.

Illustrative of examples of systems with objectives similar to the applicants are those disclosed in a paper by F. Z. Shen et al. published in the proceedings of the 1989 North American Manufacturing Research Conference (NAMRC) and in a paper by F. Richter and S. A. Spiewak also published in the 1989 NAMRC proceedings. However, both of these systems employ an architecture substantially different for that of the applicants. The former paper discloses a system wherein each monitoring algorithm runs on a separate CPU board each having a separate A/D interface. In the latter paper, a system is described wherein their Modular Multi-Processor System has only a single type of signal.

None of the above-described systems teach or disclose the system taught by the applicants. The Edge System is fully integrated, and all algorithms share the same A/D, serial, and Ethernet interface. Further, the software may be arbitrarily distributed across one or multiple CPU's in the Edge System. Additionally, unlike the system described by Richter and Spiewak, the Edge System architecture specifies a uniform interface for signal processing algorithms and Edge's Ethernet interface provides diagnostic capabilities.

The productivity of modern manufacturing operations is limited by the availability of powerful and flexible process monitoring systems. If a machine which is manufacturing a workpiece fails and is not detected, expensive parts and machine tools can be damaged. In the absence of an effective monitoring system, process conditions must, of necessity, be conservative to minimize the risk of machine failure.

Existing tool monitoring systems are narrowly designed, typically around a single type of sensor as described above. While each is appropriate with varying degrees of effectiveness in a narrow range of applications, none are fully effective in a flexible manufacturing system comprising a variety of machining operations. For example, none of the systems described by the prior art is, by itself, capable of controlling milling, drilling, turning and other machining processes. Thus, no single system exists which can control a wide range of machining operations.

SUMMARY OF THE INVENTION

An object of the invention is to provide a single system which can control a wide variety of machining operations for manufacturing a workpiece.

Another object of the invention is to provide a system for controlling the manufacture of a workpiece wherein the system has interlinked modular hardware and software.

Yet another object of this invention is to easily expand or modify the capabilities of the system to control the operations without requiring a major redesign of the software or hardware.

Still another object of the invention is to provide a system having sensors for detecting various signals in the manufacturing process and signal conditioning elements for transmitting the detected signaled to the system wherein the system includes a variety of signal processing algorithms each having preset process parameters which can be modified by the system and wherein the algorithm detects features or patterns in the signals for controlling the manufacturing process.

According to the present invention, there is provided an improved system having modular software architecture with a uniform interface to one or many signal processing algorithms and a bussed, modular system of sensors and signal conditioning electronics. Each software interface task is responsible for input to or output from a specific piece of hardware. These interface tasks translate information between external and internal formats. The external formats (the modular hardware) are specific to the environment in which the monitoring system is installed. The internal data formats (the modular software) are standardized and are independent of the external environment. The signal processing algorithm(s) only interface with these internal formats.

The addition or modification of a signal processing algorithm requires a minimal modification of the internal interface and no change to the external interface. Conversely, in order to adapt the monitoring system to a new manufacturing process (thereby requiring a different interconnection between the system and the numerical control and a different interconnection between the system and the "Edge Manager") it is only required to alter the interface tasks. Few, if any, changes need be made to the signal processing algorithms.

A signal processing algorithm may be thought of as a data filter. Its input comprises a continuous stream of raw data detected by the sensors and transmitted by the signal conditioning electronics. The output of the signal processing algorithm(s) which are controlled by preset parameters and which can be modified by various signals, can be both a stream of analyzed data and occasional "interesting" events.

When an "interesting" event occurs (which is determined by the signal processing algorithms), data providing a complete description of the event is transmitted across a network to an EDGE Manager. This dumped data will enable a later analysis of the event.

A digital bus is also part of the interface hardware for providing module status checking and control.

DETAILED DESCRIPTION OF THE INVENTION

The Edge Monitoring System can control the manufacture of workpieces on a wide variety of machine tools and be easily expanded or modified to monitor additional processes or detect new modes of tool failure. This is accomplished by utilizing a modular software architecture, with a uniform interface to one or more signal processing algorithms and a bussed modular system of sensors and signal conditioning electronics. The bussed module is for power distribution, power monitoring, and A/D connector translation.

Figure 1:
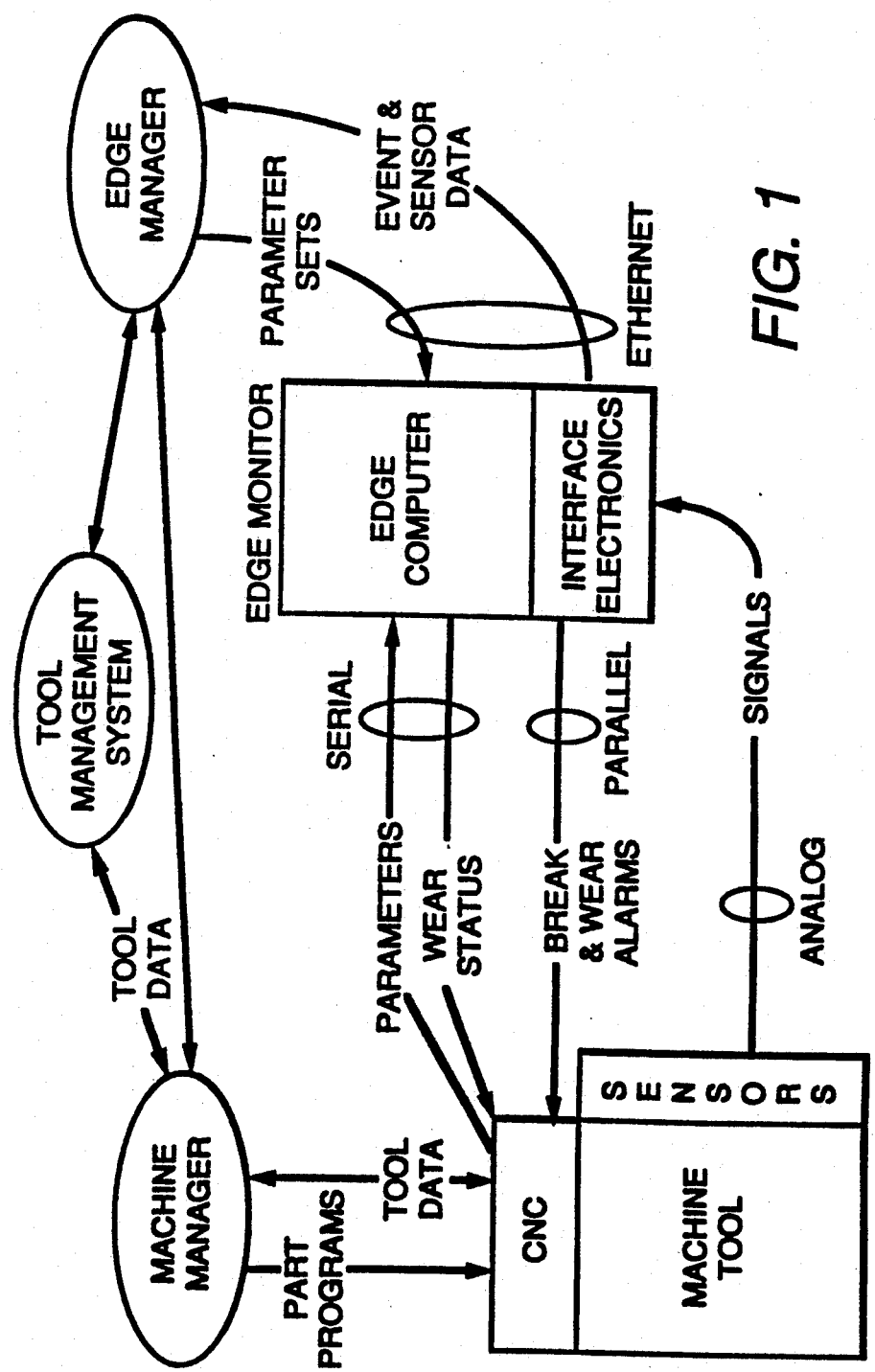
FIG. 1 is a schematic representation of the operating environment of the invention.

FIG. 1 depicts the overall environment in which the Edge Monitoring System will be employed. The Machine Manager transmits part programs and various tooling data to the Computer Numerical Control (CNC) by an RS-232 serial link. Access via a serial link is a method of data transfer between a computer and a peripheral device in which data is transmitted for input to the computer or output to the device bit by bit over a single circuit Thus, in a system of operations, each operation is performed singly and not at the same time other tasks are being completed. In this way, there is only sequential access to elements of data.

A computer numerical controller is for controlling the motions of machine components by means of numbers. In its simplest application, it is used to position the work relative to the tool. By combining the principle of numerical control with an electronic computer, it can also start and stop the machine operations, control the relative motion (path) between the work and the tool during cutting, and cause the work (or tool) to move from the position at the end of one cut to that for the beginning of the next cut. As an example, after a workpiece is set up on a table of the machine, the work and tool must be brought into proper relationship for each of the holes drilled.

In this application, the CNC controls all motions of the machine tool axes thereby controlling the machining process and the generation of the final part geometry. The CNC transmits a variety of data back to the Machine Manager which in turn forwards tooling data to the Tool Management System. The CNC also transmits data to the Edge Monitor System by both a bi-directional RS-232 serial link and a number of parallel input and output lines. By using a parallel interface, data may be considered simultaneously rather than in a specific sequence In a parallel connection between a computer and its peripherals, information is transferred along several data lines, one bit per line. This has the advantage of greatly increasing transmission speed. The serial path provides parameters and process information to the Edge Monitoring System (EMS) some of which were received by the CNC from the Machine Manager. The parallel path between the CNC and Edge transmits control information from the CNC to the EMS and provides status and alarm information from the EMS to the CNC. There is also a direct interface between the EMS and the Machine Tool. This interface comprises sensors mounted on the machine tool, on its axis and spindle drive controllers, and several boards of custom analog and digital interface electronics. The signals sent by the sensors to the Edge Interface Electronics (EIE) of the Edge Monitoring System are the real time data in analog form which are used by the signal processing algorithms of the Edge Monitoring System. The sensors can be for example, piezoelectric accelerometers, horsepower sensors, low frequency accelerometers, or current and velocity sensors.

The Edge Monitoring System is further connected via an Ethernet interface to an Edge Manager. This interface is used for downloading parameter sets to the EMS and logging events and sensor data from the EMS. The logged events and data are used by the Edge Manager and an Edge Analysis Tool to evaluate performance of the EMS, to fine tune the parameters of the signal processing algorithms, and to develop parameters for new machining processes. This is the overall conceptual framework of the system of the Applicants' invention. The following will describe each component illustrated in FIG. 1 in a more specific and detailed manner.

The Machine Manager automatically selects the mode of operations of the machine tool. It supplies the part program of cuts to be made on the workpiece. The part program is sent to the CNC via an RS-232 serial link. The CNC can be programmed to make the proper response to a detected event without human intervention. The information from the part program can be used by the CNC to optimize the machining conditions to be expected on each individual cut. The part program is a software program which directs the CNC, which in turn, controls the spindle and tool feed drives, for example, to obtain the desired depth of cut, surface speed, or feed rate, and controls the selection of the tool with which the machining is accomplished. The part program can also control part gauging and tool offset measuring cycles in addition to the cutting operations. Consequently, the information which determines the best configuration of the Edge detection algorithms resides in the part program. Information such as speed, feed, depth of cut, or tool geometry may be used by the detection algorithms to discriminate between normal and abnormal manufacturing events. The part program configures the detection algorithms in the EMS. This provides the algorithms with the configuration parameters for the specific tooling operation. The parameters set for the particular algorithm optimize detection of workpiece manufacturing events.

In addition to controlling the machining operations of the machine tool, the CNC also reports a variety of status information back to the Machine Manager (MM) and parameters and process information to the EMS. The status information is reported by the CNC to the MM via an RS-232 serial link. Parallel signals and serial messages are reported by the CNC to the EMS. Once cutting has begun, the EMS tells the CNC of catastrophic events via the parallel link. The parameters installed in the signal processing algorithms optimize this event detection. The interface signals and messages which can pass, for example, between the CNC and the EMS are summarized in the table below.

TABLE 1

CNC Interface Signals and Messages

PARALLEL

| Inputs (to EDGE) | Outputs (from EDGE) |
| --- | --- |
| Sensor Reset | Sensor Operational |
| Break Mode Enable | Break Mode Active |
|  | Break Alarm |
| Wear Mode Enable | Wear Mode Active |
|  | Wear Alarm |
| Interrogate Wear Sensor | Serial Data Acknowledge |

SERIAL

| Inputs | Outputs |
| --- | --- |
| Control Message |  |
| Parameter Message | Wear Status Message |
| Break Alarm Message |  |
| Tool Change Message |  |
| Program ID Message |  |
| Cut Number Message |  |

The Edge Monitoring System also receives signals from a variety of sensors mounted on the machine tool via the Edge Interface Electronics. These sensors can be designed to detect a wide variety of signals in the machining process. They can be for sensing high frequency vibrations of the tooling process, an acoustic emission sensor, a force transducer, etc. For example, the Machine Tool Monitor of U.S. Pat. No. 4,806,914 uses a single sensor that is small and rugged and may be mounted a reasonable distance from the tool/workpiece interface. Such a vibration sensor is the VM 1000 accelerometer (Vibra-Metrics, Inc., Hamden, CT), used in a region of relatively high sensitivity near its resonant frequency. It is usually located near the part or cutting tool and a miniature slip ring and coaxial wire connect it to an analog preprocessor. The slip ring is optional and is used only for some machine tool designs. Raw data signals from the sensors are conditioned by EIE modules. These EIE modules may comprise both remote modules and main modules. By having remote EIE modules the raw sensor signals would be less subject to noise or other signal detracting influences prior to their conditioning. That is, the amount of signals conveying information will greatly exceed the amount of signals not conveying information. The conditioned signals are passed to the VME analog to digital converter (A/D). The A/D board is the gateway to the Edge computer software and provides a digital parallel interface to the Edge.

When main EIE modules and remote EIE modules are employed, there are typically four EIE main modules: the bus module, the UE (Ultrasonic Energy)/clock module, the CNC module, and the drive modules. The main modules typically serve three functions: minor input signal conditioning, remote module monitoring and control, and convenient test point access. In addition, one main module—the UE/Clock—generates a clock which paces the entire system.

The bus is a series of parallel conducting paths connecting the various hardware paths of the EDGE System over which the data is communicated. Buses may be internal to a processor, may connect a processor to main or secondary memory or may connect a computer system to outside peripherals.

Figure 2:
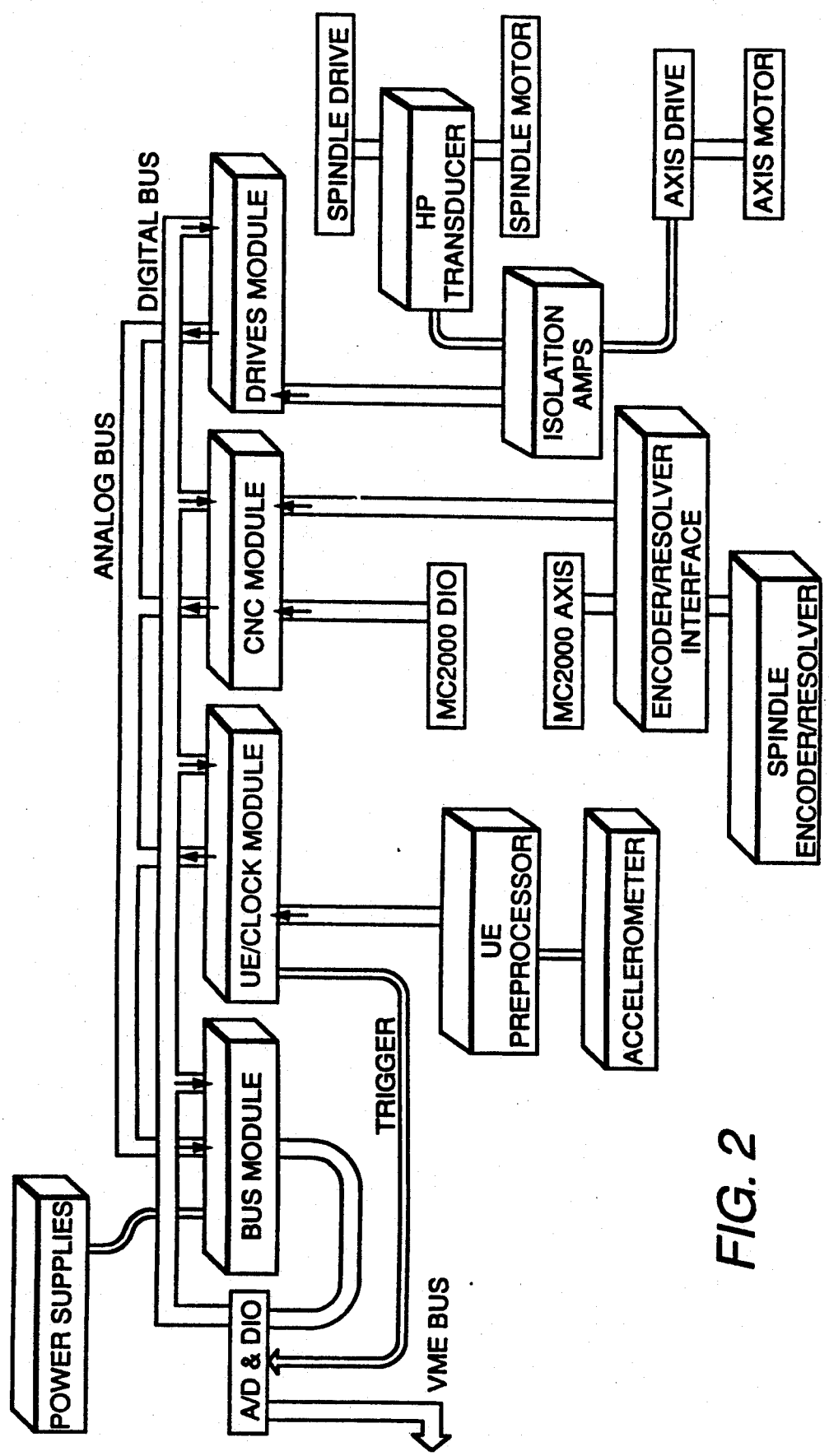
FIG. 2 is a schematic representation of the architecture of the hardware of the present invention.

Normally, the EIE is grounded at a common machine ground but the design allows it to have an independent ground source if required to reduce ground loop problems. In addition, the four remote EIE interface modules are the UE preprocessor, the resolver interface, the encoder interface, and the isolation amplifiers. These can be seen schematically in FIG. 2. This Figure depicts the interconnections between the main and remote EIE modules and the analog and digital busses effecting this interface. It is shown in FIG. 2 that the drive module is connected to the isolation amplifiers, the CNC module is connected to the resolver and the encoder interface, and the U.E./clock module is connected to the ultrasonic energy preprocessor. The bus main module is totally internal in this format. Each of these remote EIE interface modules have an analog output. The analog signal conditioning performed by the remote and main EIE modules can be modified to optimize the monitoring of the machine tool process.

Figure 3:
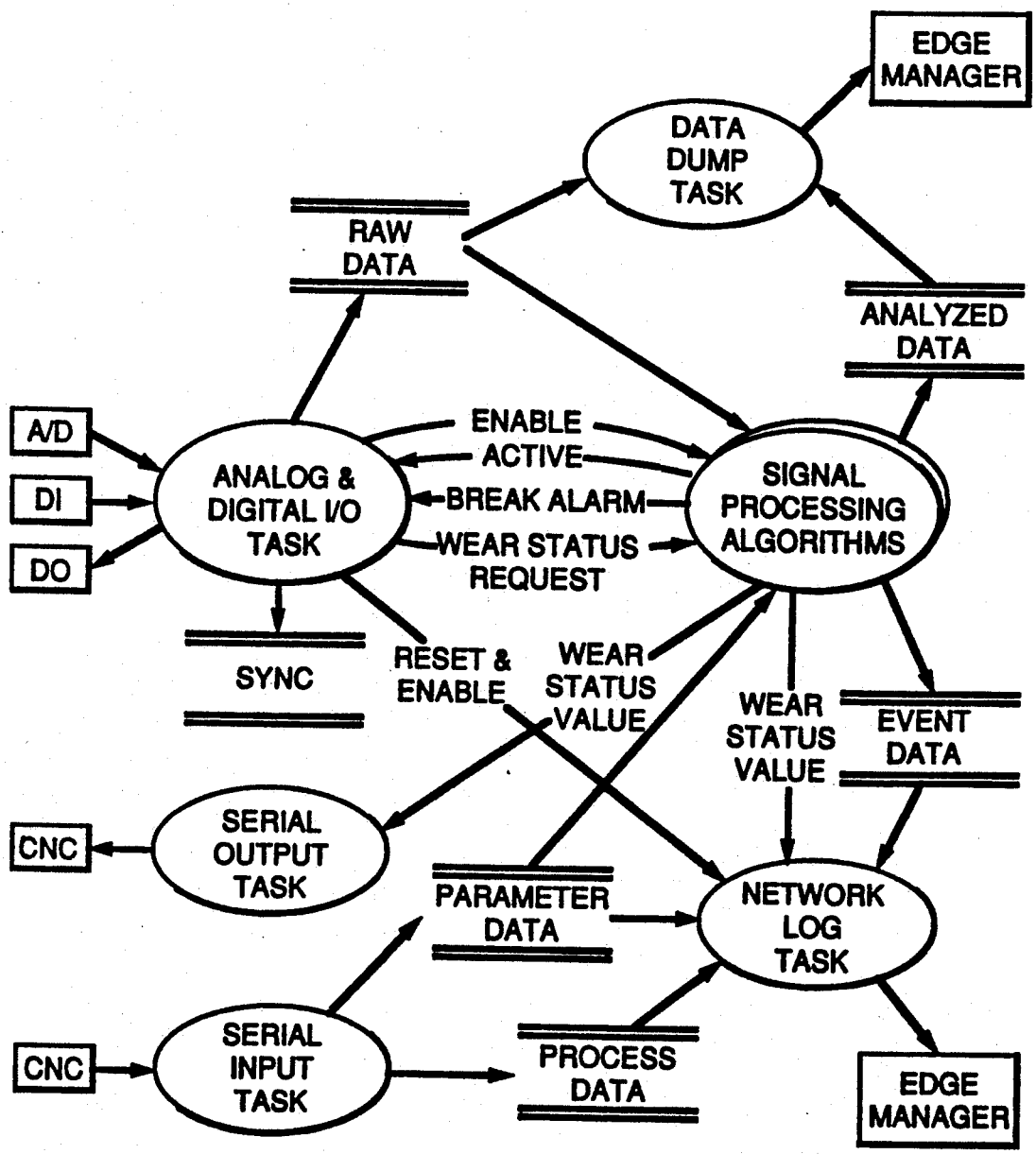
FIG. 3 is a schematic representation of the architecture of the software of the present invention.

The EMS comprises the modular software and hardware architecture of the invention. The external modular hardware interfaces discussed above determine the top-level structure of the Edge software. This structure, for a real time system, is a set of independently executed tasks or processes. The principal tasks of the EMS are circled in FIG. 3. The external interfaces for which each task is responsible are depicted within the rectangles of FIG. 3. The main global data structures are shown bracketed by two sets of double horizontal lines and the principal communication paths between the tasks are portrayed with arrows. The EMS contains at least one signal processing algorithm, and preferentially many algorithms each dedicated to a specific machining task or to detecting a specific type of manufacturing event. These processing algorithms perform as data filters taking raw data input from the external format and yielding an output of analyzed data. Each algorithm performs and controls a specific function and selects the proper raw data to be used by that particular algorithm.

When the raw integer data from the A/D board is fed to the EMS, it is copied into a raw data ring buffer by the A/I and DI/O ISR. The capacity of the ring buffer must exceed the "worst case" response time of the algorithm. This is to enable the algorithm to properly access the stream of raw data. Therefore, the operating system necessitated by the EMS must contain ring buffers and message queues to provide the asynchronous operation of the algorithm. This is because the algorithm operates without regular time relationships and its operating speed is not related to any particular frequency of the system to which it is connected.

The data copied into the raw data ring buffer includes all analog inputs and all digital inputs (the digital inputs include a copy of the outputs). The buffer is the memory area used for the temporary storage of information that has just been received. The information is held in the buffer until the algorithm is ready to process it. The analog and digital I/O task adds tach, spindle period, gain data, a time stamp, and other parameters to each raw data structure prior to notifying the signal processing tasks that the raw data is available.

Figure 4:
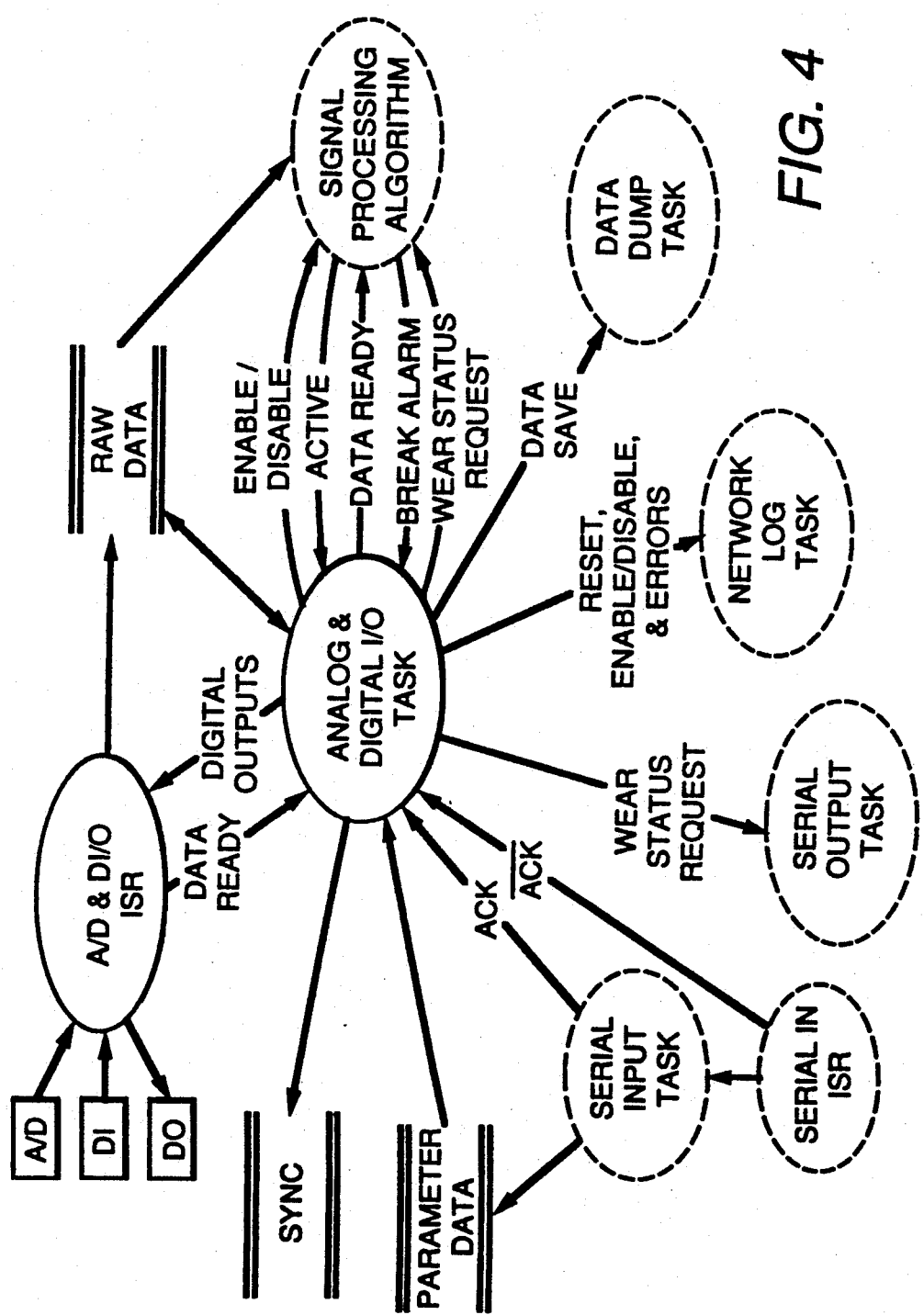
FIG. 4 is a schematic representation depicting the data flow between the analog and digital I/O task and the other tasks of the Edge computer.

The ADIO task, shown in FIG. 4, also maintains the global synchronous time value. The synchronous time value "Sync" counts all data samples since the last system reset and is used for all internal timing (e.g., of digital inputs and outputs) to correlate raw data, analyzed data, events, and messages when debugging the system or examining the output of the signal processing routines. (Sync is a 32-bit unsigned integer incremented at the highest sampling rate of the sensors, e.g., the U.E. sensor. The sync counter will overflow only if the time between resets exceeds a specified length of time).

Figure 5:
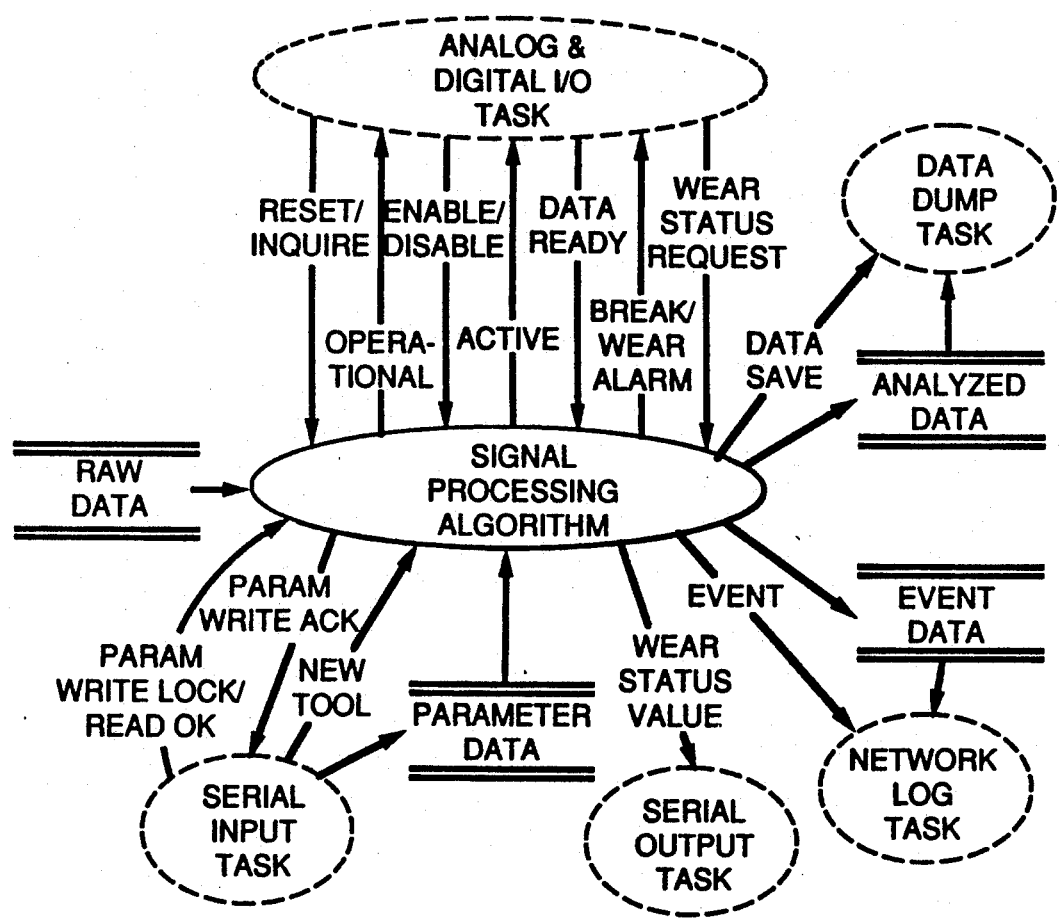
FIG. 5 is a schematic representation of the interface to the signal processing algorithm.

As shown in FIG. 5, the input stream of Raw Data is processed to yield an output stream of Analyzed Data and occasional packets of Event Data. The state (Reset, Active) of the algorithm is controlled by signals from the Analog and Digital I/O Task. The specific behavior of the algorithm is determined by parameter values from the Serial Input Task as explained above. There may be several signal processing algorithm tasks which are executing simultaneously and independently in the EDGE computer. Any single algorithm may perform break detection, wear monitoring, or both.

The signal processing algorithms have no direct interface to anything external to the EDGE Computer. The data flow diagram (FIG. 5) shows all communications between the Signal Processing Algorithms and the other tasks in the EDGE Computer. The following are the conditions under which these communications occur.

The Analog and Digital I/O Task sends a "Data Ready" message to each algorithm every time a new Raw Data structure is available in the raw data ring buffer. When an algorithm task receives a "Data Ready" message, it reads and processes the associated raw data.

One risk introduced by a ring buffer is that the writing task may get so far ahead of the reading tasks(s), that it begins overwriting data which has not yet been read. In the EDGE system, the length of the raw data ring buffer greatly exceeds the total number of message buffers available in the system. If the algorithm tasks get too far behind, most of the message buffers will be consumed by unprocessed "Data Ready" messages. The software will detect an "out of system message buffers" error long before any raw data is lost.

There is one analyzed data ring buffer for the analyzed data output for each signal processing algorithm. That is, each algorithm has a private ring buffer for its output. Each algorithm may store whatever it wishes, at any rate it wishes (1/sample, 1/rev, . . . ), in its ring buffer. The information stored at any time should be adequate to reconstruct the circumstances leading up to the algorithm's state at that time. All raw and analyzed data ring buffers are divided into logical segments, each typically one second long. One or more segments may be read and dumped by the Data Dump Task, for use in analyzing tool breaks, developing parameters, or debugging algorithms.

A shared pool of event data buffers is available to all tasks in the system. All event data buffers are the same size (typically, 128 bytes). For example, the first field in the buffer is the event type; its value determines the format of the remainder of the buffer. New event types and formats may be easily defined and added to the system.

The Parameter Data array is a table of structures. Each algorithm reads only the parameters it needs. Configuration (non-modifiable) parameters are read at Reset. Parameters which may be modified by the part programmer are read at every Break or Wear Enable, and may be read at Reset, if they are used while the algorithm is inactive. Access to the parameter data structure is interlocked by the Serial Input Task, to prevent other tasks from reading while parameter values are modified.

Figure 6:
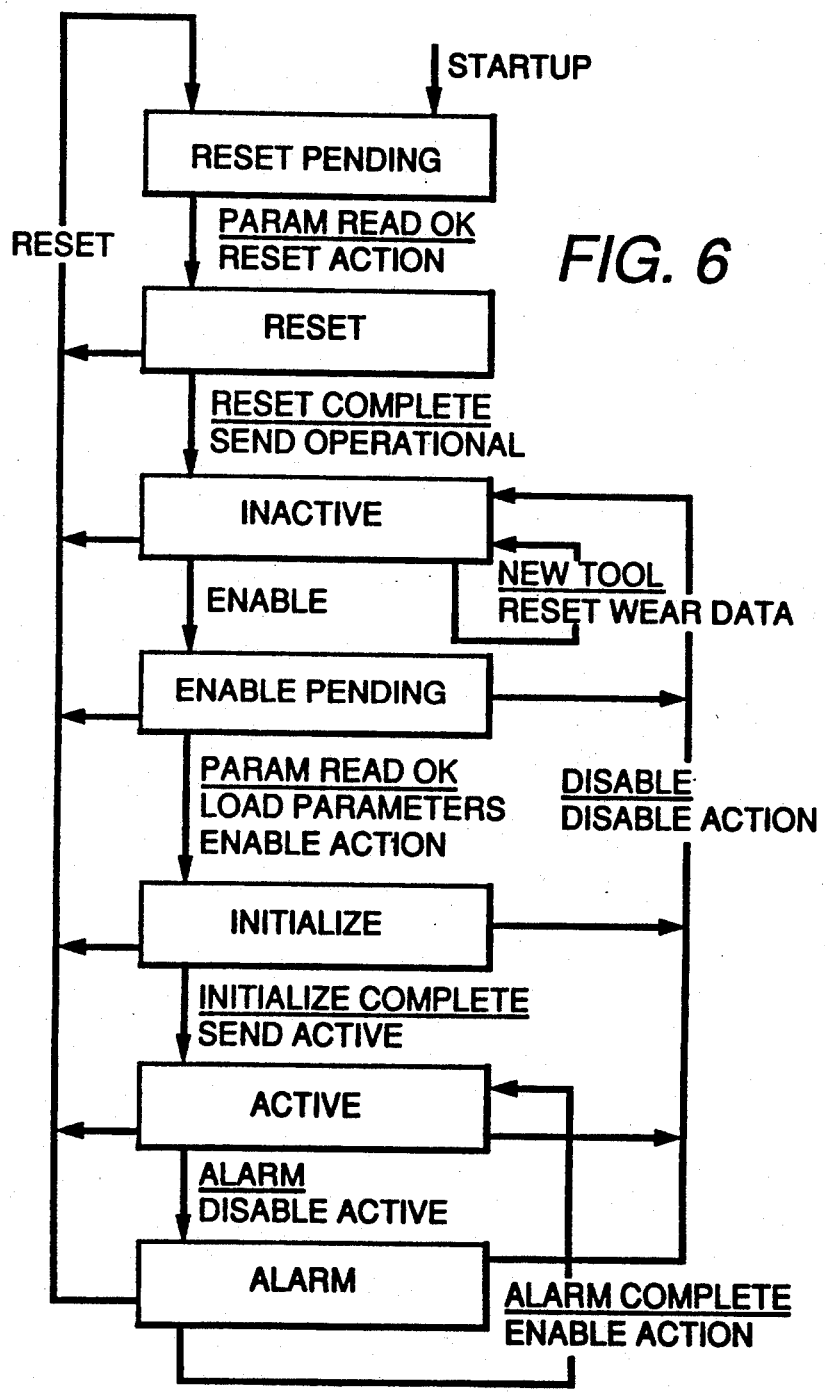
FIG. 6 is a state transition diagram for the signal processing algorithm.
Figure 7:
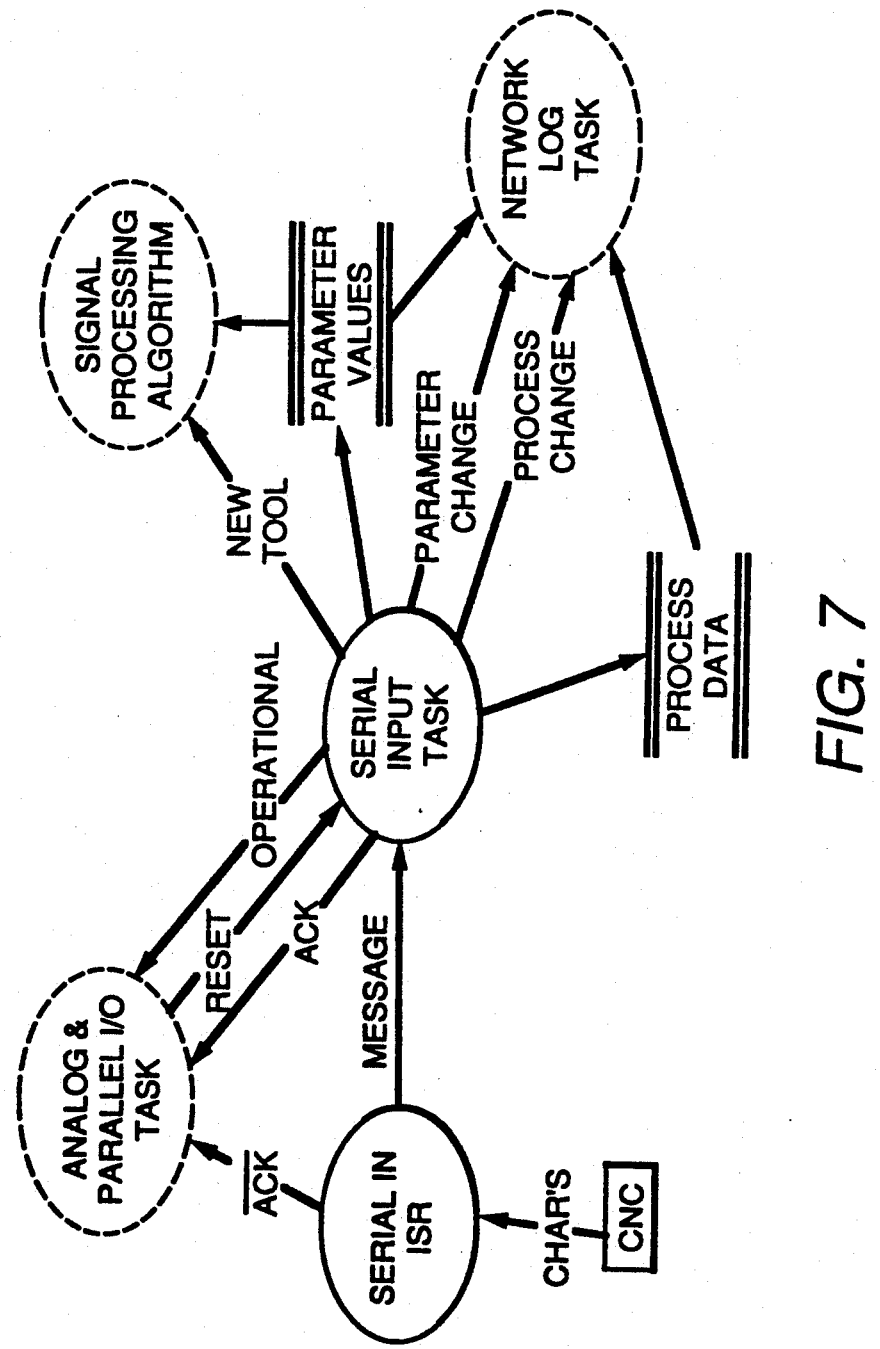
FIG. 7 is a schematic representation of the tasks of the serial inputs to the Edge Computer.
Figure 8:
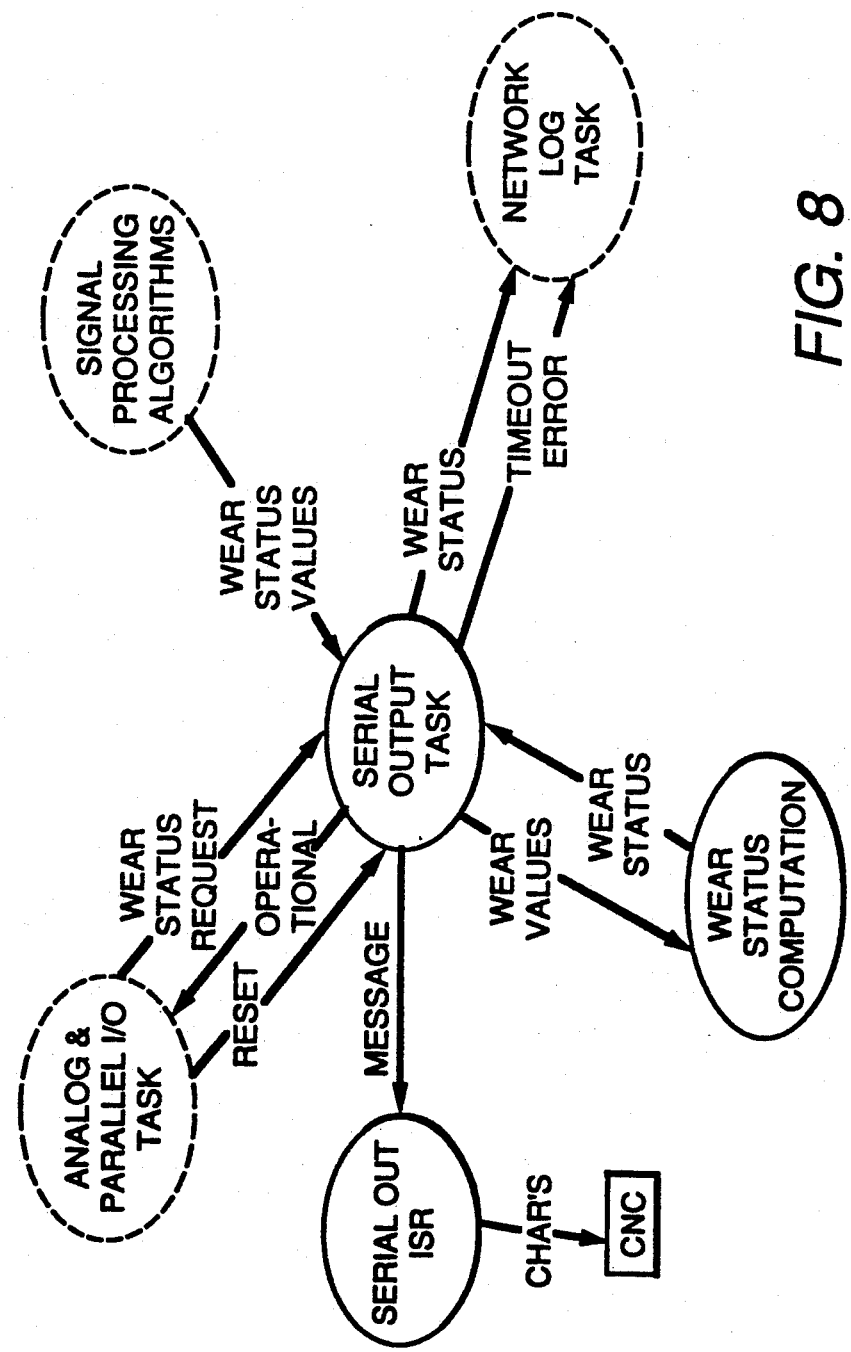
FIG. 8 is a schematic representation of the tasks of the serial outputs to the Computer Numerical Controller.
Figure 9:
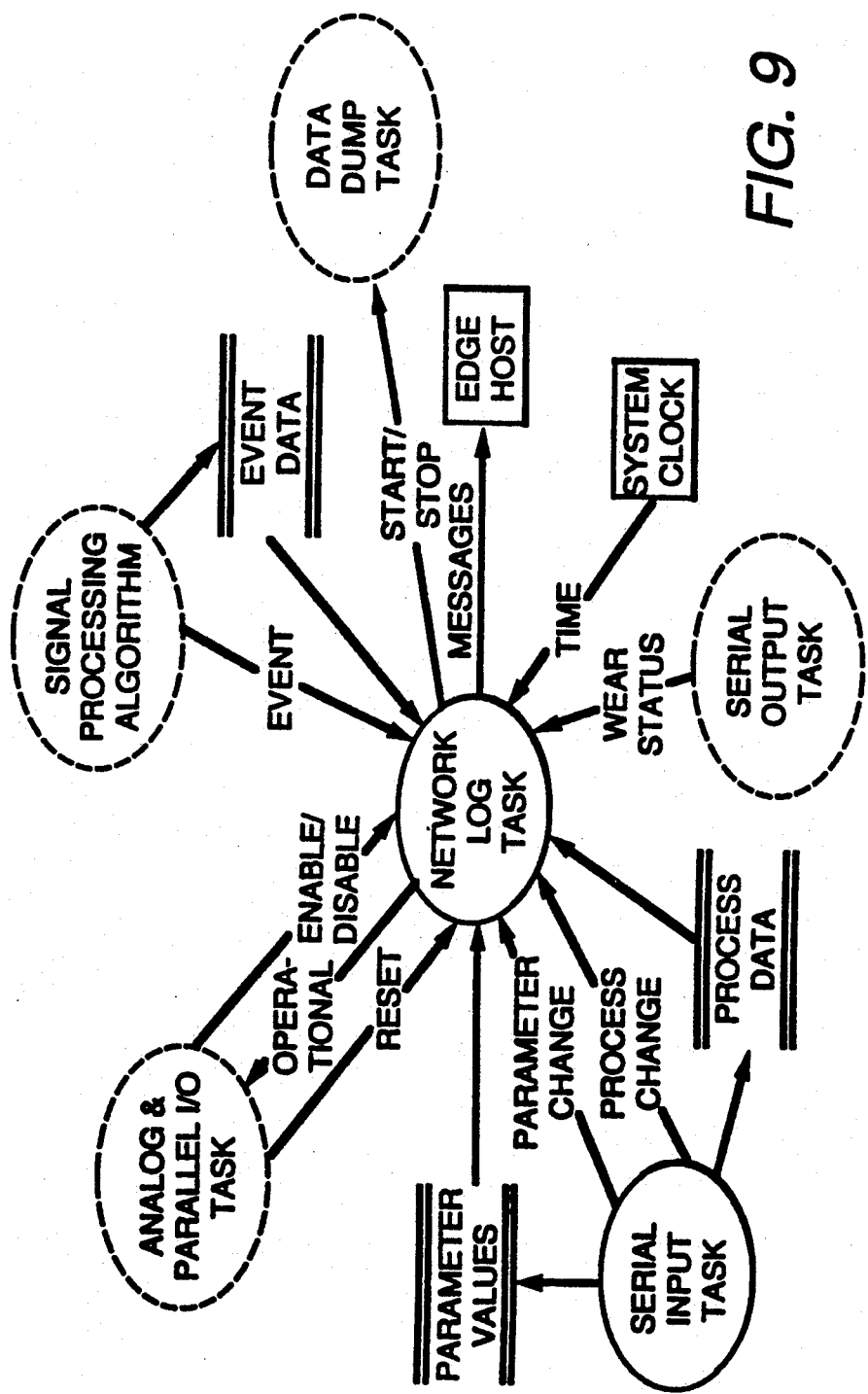
FIG. 9 is a schematic representation showing all communication between the Network Log Task and the other tasks of the Edge Computer.
Figure 10:
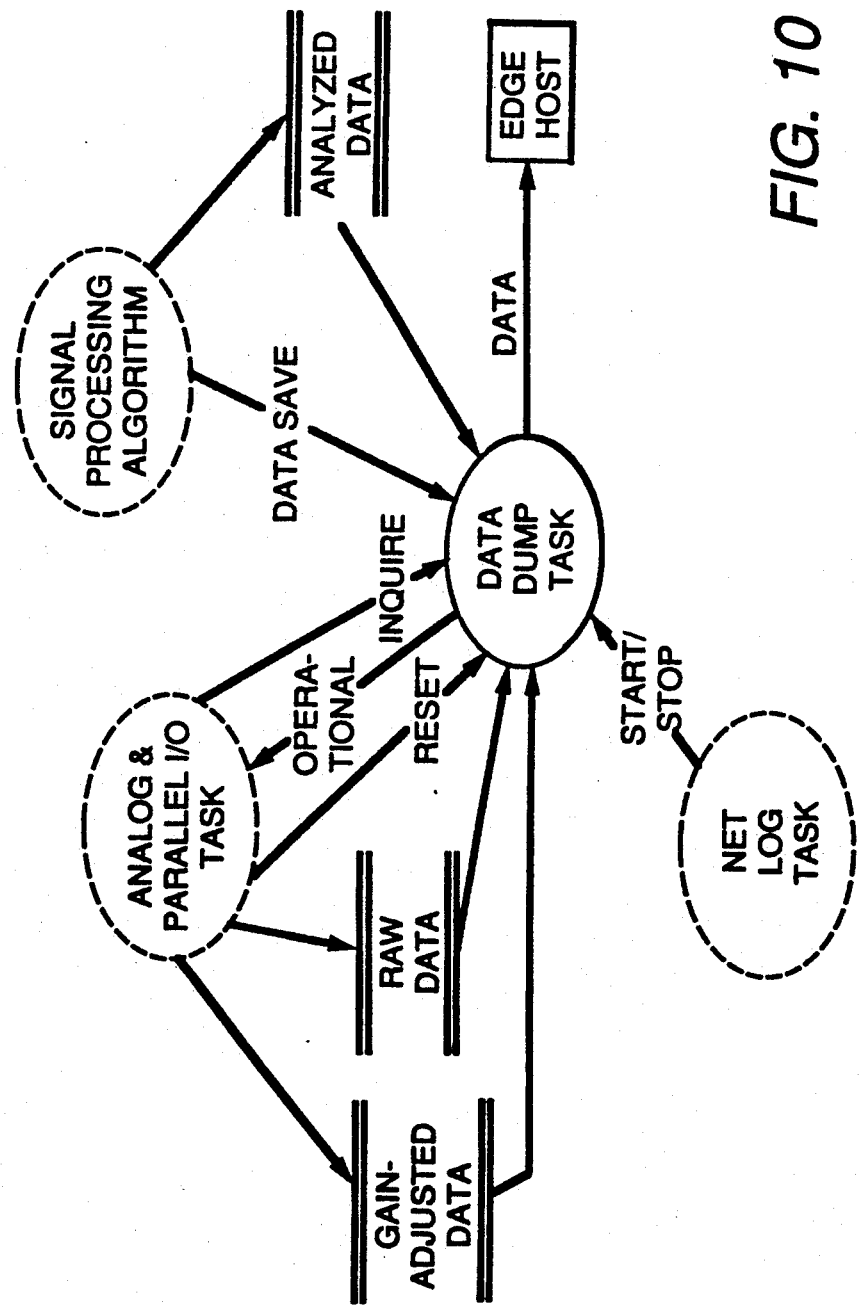
FIG. 10 is a schematic representation depicting all communication between the Data Dump Task and the other tasks of the Edge Computer.

The state transition diagram for a signal processing algorithm is shown in FIG. 6. At startup, or when a Reset and Reset Trailer message pair is received, the Task enters the Reset Pending State. When the Serial Input Task finishes loading the Parameter Table, it sends a Parameter Read OK message, and the algorithm enters the reset state. On entry to the reset state, the algorithm clears all internal buffers and variables, resets its analyzed data pointer to the start of the analyzed ring buffer, and reads its configuration parameters. The algorithm may remain in the Reset state briefly, if it is necessary and possible to quickly initialize data buffers used for signal processing. When fully reset, the algorithm sends ar "Operational" message to the ADIO task and enters the Inactive state.

When the "Enable" message is received, the algorithm loads all of its parameters (except configuration parameters) from the Parameter Table. If the Parameter Table is locked by the Serial Input Task, the algorithm waits in the Enable Pending state until the parameters are unlocked.

After loading parameters, the algorithm initializes its internal variables and buffers. As at Reset, these initializations are divided into those which can occur immediately (the Enable Actions), and those which require some raw data (the Initialize state). When initialization is complete, the algorithm sends an "Active" message to the ADIO task and enters the Active state. Time allowed in the Initialized state is limited. If large data buffers must be filled, this is done continuously while inactive, or the user must accept that full performance will not be attained until some time after the algorithm becomes Active.

Break algorithms may start fresh, with no recorded history, at each Break Enable. Wear algorithms will clear their history variables when a "New Tool" message is received, then preserve and update that history through successive Wear Enables and Wear Disables.

If an "Inquire" message is received, and the algorithm is not in the Reset Pending or Reset states, then the algorithm immediately responds by sending an "Operational" message.

When in the Active state, if it detects a pattern in the incoming data which corresponds to a tool break, an algorithm will send a Break Alarm signal to the Analog and Digital I/O Task. Break Alarms will be issued only when Break Mode is Enabled and Active. Wear Alarms are never issued. After sending a Break Alarm, the algorithm executes the Disable Actions and enters the Alarm state (which is generally equivalent to the Inactive State). It remains in the Alarm state for a fixed period of time (determined by a configuration parameter), to allow the CNC to respond to the alarm and to allow the process conditions which caused the alarm to go away. When the alarm time has expired, the algorithm will execute the Enable Actions and automatically reenter the Active state. In practice, the CNC will generally disable the algorithm after ar alarm, before it can become Active again.

When a "Disable" message is received, the algorithm clears its internal variables and returns to the Inactive state. It may continue to process incoming data (e.g., to maintain a running mean), but should not interpret that data as being representative of any tool or machining process. When Inactive, algorithms must not issue alarms.

On receipt of a Wear Status Request signal, each algorithm which is monitoring wear will compute and send its current Wear Status Value to the Serial Output Task. Each algorithm's Wear Status Value could be, for example, an integer between zero and nine (inclusive). This could also be generalized to allow Event Data structures as Wear Status Values. The Serial Output Task is responsible for synthesizing a single Wear Status from the various Wear Values. Wear Status may be requested when Wear Mode is enabled or disabled. If an algorithm is not monitoring wear or has received insufficient data, it will send a Wear Status value of 0. From the data received, the EMS can infer information about both the workpiece and the machine tool.

The EMS further includes an interface to an Edge Manager from which parameter sets are received, and to which events and sensor data are logged. These logged events and data are used by the Edge Manager and Edge Analysis Tool to evaluate the performance of the Edge Monitor, to develop new parameters for new machining processes or to adjust the current parameters for the current machining process, or for later use. This is to provide a diagnostic analysis of how the EMS is functioning. The raw data and/or the analyzed data that is dumped to the Edge Manager is for fine tuning the algorithm and to provide an analysis of the Machine Tool control. Both the analog portion (the EIE interface) and the digital portion (the algorithm) of the EMS can be modified to optimize the machine tool process.

Each of these applications imposes requirements on the interface. At the low end of the volume, rate, and priority scale is a parameter set download (the EDGE Monitor is inactive, and the machine tool can wait until the download is complete). The high end will be data saving (continuously transmitting raw data or analyzed data generated by one or more signal processing algorithms to the Manager in real time). A network such as Ethernet meets requirements for the data transmission speed for the system. A token-ring or FDDI (Fiber Distributed Data Interface) network should also provide adequate performance. One or more local storage devices, such as a Winchester or floppy disk, could also be used. By removing or replacing the storage media, logged events and data could be transferred to another system for analysis and new parameter sets could be transferred to the EMS. It is important for the capacity of the data transfer pathway to exceed the rate of events that one wants to log or record.

In the present configuration, each EDGE Monitor is connected to the EDGE Manager via an Ethernet network. The TCP/IP protocol is used for all Ethernet communications. Much of the overhead of the TCP/IP protocol is borne by a dedicated CPU. Ethernet communications are therefore expected to have relatively little impact on the real-time performance of the system.

The TCP/IP software can support several simultaneous and logically independent connections between each EDGE Computer and the EDGE Manager. The Network Log Task maintains one such connection, to send messages for inclusion in the System Log File. A second connection is used to save data. Separate connections for downloading parameter sets to the EDGE Computer, or for monitoring and debugging the Computer during machining operations, can be established, as needed.

Initialization of connections to the Data and Event servers in the EDGE Manager can, for example, use an interface such as the standard BSD Unix socket interface. The servers are started on demand, using the capabilities inherent in the BSD Unix internet daemon, /etc/inetd. This capability is critical to the proper functioning of the system, since it allows the servers to crash and reboot without adversely affecting the EDGE Computer, as described in the following paragraph.

If the connection to a Data or Event Server is severed, no interruption in the rest of the system must be seen. In the current system, both the data dump and network log tasks redirect their output to a null device, then periodically try to reestablish the connection to their respective servers. One capability of the system is that of a "heartbeat". If data has not been sent to a server for a long period of time (typically one to several minutes), then the client task (Data Dump or Network Log) attempts to communicate with the server. Without this capability, the first part of the next piece of data dumped to the server will be lost.

At any time, and at its own discretion, a signal processing algorithm of the EMS may declare an Event. All Alarms are events. The algorithm obtains an Event Data buffer from the operating system, sets the Event Type field, and then fills the remainder of the buffer according to the format appropriate for that event type. As much data as possible should be included, to provide a complete description of the event. The algorithm sends an "Event" message to the Network Log Task, which reads the event buffer, sends the event data across the Ethernet to the EDGE Manager, then returns the event buffer to the operating system.

While analyzing data, in any state, each algorithm reads from the Raw Data structure and writes to its own Analyzed Data structure. When it fills a segment of Analyzed Data, the algorithm sends a "Data Save" message to the Data Dump Task, to notify it that the data is available. The Data Dump Task may dump the analyzed data immediately, or may remember its availability and dump it later if a particular Event occurs.

Raw data is dumped for example, for the simulation of a new algorithm. A particular data stream can also be selectively dumped for the analysis of a particular event. Raw data is dumped from the raw data ring buffer via Ethernet to the Edge Manager. Analyzed data is dumped from the output of the algorithm (the analyzed data ring buffer) via Ethernet to the Edge Manager. Both sensor data and/or event data can be dumped for analysis.

Examples of event data can be occasional status information from the serial link to the CNC. As before described, each algorithm may determine an "interesting"

event and the algorithm would then send out event data which would be a packet of information describing that event. Events can also be used to trigger data dumps. For example, the Edge Manager may "say" to the Edge Monitor when a specific event (a U.E. break alarm) occurs dump "this" packet of data. When the U.E. break alarm occurs, then, for example raw data acquired between 10 seconds before the alarm and 5 seconds after the alarm, and analyzed data generated between 2 seconds before the alarm and 2 seconds after the alarm is dumped to the Edge Manager via Ethernet. This combination of raw and analyzed data will enable a proper analysis of the response of the software. Potentially anything from the Edge Monitor could be logged as an event, even internal error messages in the software.

What we claim is:

1. A system for manufacturing a workpiece comprising modular hardware interlinked with modular software, wherein said modular hardware comprises:
    (a) sensors for detecting signals in the manufacturing process;
    (b) signal conditioning elements for transmitting said detected signals to the system;
wherein said modular software comprises one or more signal processing algorithms adapted for detecting features in aid detected signals for controlling the manufacture of the workpiece, wherein one or more interface task and data structures isolate the signal processing algorithms from external data formats, wherein said interface tasks and external data formats comprise a computer network interface, wherein said computer network interface is operable for recording sensor data and other diagnostic information, and wherein said computer network interface automatically reconnects if a network connection is broken and discards data without disrupting real-time performance if the network connection cannot be reestablished.

2. The system of claim 1 wherein said sensor comprises a piezoelectric accelerometer for detecting ultrasonic energy.

3. The system of claim 1 wherein said sensor comprises a horsepower sensor for detecting the power consumed by the manufacturing process.

4. The system of claim 1 wherein said sensor comprises a low frequency accelerometer.

5. The system of claim 1 wherein said sensor comprises a current sensor for detecting the axis current.

6. The system of claim 1 wherein said sensor comprises a tachometer for detecting the velocity of a rotating axis in the manufacturing process.

7. The system of claim 1 wherein said sensor comprises a sensor for detecting the functioning of said signal conditioning elements.

8. The system of claim 1 wherein said signal conditioning elements comprise isolation amplifiers.

9. The system of claim 1 wherein said signal conditioning elements comprise a resolver and an encoder interface.

10. The system of claim 1 wherein said signal conditioning elements comprise an ultrasonic energy preprocessor.

11. The system of claim 1 wherein said signal conditioning elements comprise a drive module.

12. The system of claim 1 wherein said signal conditioning elements comprise an internal bus module.

13. The system of claim 1 wherein said signal conditioning elements comprise a computer numerical control module.

14. The system of claim 1 wherein said signal conditioning elements comprise an ultrasonic energy module.

15. The system of claims 1 or 14 wherein said signal conditioning module comprise a clock module.

16. The system of claim 1 wherein said signal processing algorithm is adapted to output a continual stream of analyzed data.

17. The system of claim 1 wherein said signal processing algorithm is adapted to output packets of event data.

18. The system of claim 1 wherein said signal processing algorithm executes tasks simultaneously and independently.

19. The system of claim 1 wherein one or more processing parameters of said signal processing algorithm are changed for modifying the manufacturing process.

20. The system of claim 1 wherein one or more alternate signal processing algorithms are substituted for said signal processing algorithms.

21. The system of claim 1 wherein message queues and data ring buffers provide for asynchronous operation of the signal processing algorithms.

22. The system of claim 1, wherein said computer network interface is used for modifying the system's response to signals from the manufacturing process.

23. The system of claim 1 wherein said signal processing algorithm is a tool break detection algorithm based on monitoring of ultrasonic energy.

24. The system of claim 1 wherein said signal processing algorithm is a tool wear detection algorithm based on monitoring of spindle power and ultrasonic energy.

25. The system of claim 1 wherein said modular software comprises a plurality of the signal processing algorithms and wherein the signal processing algorithms only interface with internal data formats, said internal data formats being standardized and independent of the external environment.

26. A method of manufacturing a workpiece, comprising:
    (a) detecting signals in the manufacturing process by one or more interchangeable and modular sensing means;
    (b) transmitting said detected signals by interchangeable and modular signal conditioning means; and
    (c) processing said signals from said signal conditioning means by at least one signal processing algorithm means by detecting features in said signals for controlling the manufacturing process, said at least one signal processing algorithm means is modular software interlinked with said interchangeable and modular signal conditioning means, said at least one signal processing algorithm means is isolated from external data formats by one or more interface tasks and data structures, said interface tasks and external data formats comprise a computer network interface, and further comprising the steps of:
    using said computer network interface for recording sensor data and other diagnostic information;
    automatically reconnecting said network interface upon breaking of a network connection; and
    discarding data without disrupting real-time performance if the network connection cannot be reestablished.

* * * * *